United States Patent
Regev et al.

(10) Patent No.: US 9,785,790 B2
(45) Date of Patent: Oct. 10, 2017

(54) PROTECTING COMPUTER SECURITY APPLICATIONS

(71) Applicant: INTERNATIONAL BUSINESS MACHINES CORPORATION, Armonk, NY (US)

(72) Inventors: Shmuel Regev, Tel-Aviv (IL); Shahar Kohanim, Rehovot, IL (US); Shai Barlev, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/969,239

(22) Filed: Dec. 15, 2015

(65) Prior Publication Data

US 2017/0169238 A1 Jun. 15, 2017

(51) Int. Cl.
| | |
|---|---|
| *G06F 21/62* | (2013.01) |
| *G06F 9/44* | (2006.01) |
| *G06F 21/57* | (2013.01) |
| *G06F 21/55* | (2013.01) |
| *G06F 21/53* | (2013.01) |

(52) U.S. Cl.
CPC ........ *G06F 21/6218* (2013.01); *G06F 9/4401* (2013.01); *G06F 9/4406* (2013.01); *G06F 21/575* (2013.01); *G06F 21/53* (2013.01); *G06F 21/55* (2013.01)

(58) Field of Classification Search
CPC ...... G06F 21/6218; G06F 21/53; G06F 21/55; G06F 9/4401; G06F 9/4406; G06F 21/575; G06F 21/57; G06F 2211/1097
See application file for complete search history.

(56) References Cited

U.S. PATENT DOCUMENTS

| | | | |
|---|---|---|---|
| 7,757,030 B2 | 7/2010 | Sherwin | |
| 8,056,119 B2 * | 11/2011 | Gillet | .................. G06F 21/6209 |
| | | | 713/182 |
| 9,117,081 B2 | 8/2015 | Lukacs | |
| 2002/0174215 A1 | 11/2002 | Schaefer | |
| 2004/0226023 A1* | 11/2004 | Tucker | ...................... G06F 9/54 |
| | | | 719/315 |
| 2004/0236960 A1 | 11/2004 | Zimmer | |
| 2004/0268141 A1 | 12/2004 | Zimmer et al. | |

(Continued)

FOREIGN PATENT DOCUMENTS

EP       2141625       1/2010

OTHER PUBLICATIONS

G. Erdelyi, "Hide'n'Seek? Anatomy of Stealth Malware," 2003, F-Secure Corporation, Helsinki, Finland.

(Continued)

*Primary Examiner* — Eleni Shiferaw
*Assistant Examiner* — Nelson Giddins
(74) *Attorney, Agent, or Firm* — Daniel J. Swirsky; AlphaPatent Associates Ltd.

(57) ABSTRACT

Protecting a computer security application by executing the computer security application on a computer in a first namespace associated with an operating system of the computer, and creating a second namespace associated with the operating system of the computer, where the second namespace is accessible to the computer security application, and where the first namespace is inaccessible from the second namespace.

7 Claims, 3 Drawing Sheets

(56) References Cited

U.S. PATENT DOCUMENTS

| | | | |
|---|---|---|---|
| 2006/0080522 A1 | 4/2006 | Button et al. | |
| 2006/0265761 A1* | 11/2006 | Rochette | G06F 21/53 |
| | | | 726/27 |
| 2009/0007100 A1 | 1/2009 | Field | |
| 2009/0319806 A1* | 12/2009 | Smith | G06F 21/575 |
| | | | 713/193 |
| 2011/0093691 A1* | 4/2011 | Galicia | G06F 9/441 |
| | | | 713/2 |
| 2011/0154431 A1* | 6/2011 | Walsh | G06F 21/53 |
| | | | 726/1 |
| 2013/0198367 A1* | 8/2013 | Abraham | G06F 9/4856 |
| | | | 709/224 |
| 2013/0290981 A1* | 10/2013 | Yasukawa | G06F 3/00 |
| | | | 719/313 |
| 2013/0311682 A1* | 11/2013 | Barat | G06F 9/44505 |
| | | | 710/14 |
| 2015/0082013 A1 | 3/2015 | Horvath | |
| 2016/0182498 A1* | 6/2016 | Straka | G06F 3/0619 |
| | | | 711/114 |
| 2016/0239287 A1* | 8/2016 | Lim | G06F 21/51 |

OTHER PUBLICATIONS

S. Maccaglia, "Rotten to the Core . . . A Roundup on Rootkits," Dec. 2012, Issue 35, ClubHACK Magazine, Pune, India.
R. Wilkins, B. Richardson, "UEFI Secure Boot in Modern Computer Security Solutions," Sep. 2013, uefi.org, Beaverton, Oregon, USA.

* cited by examiner

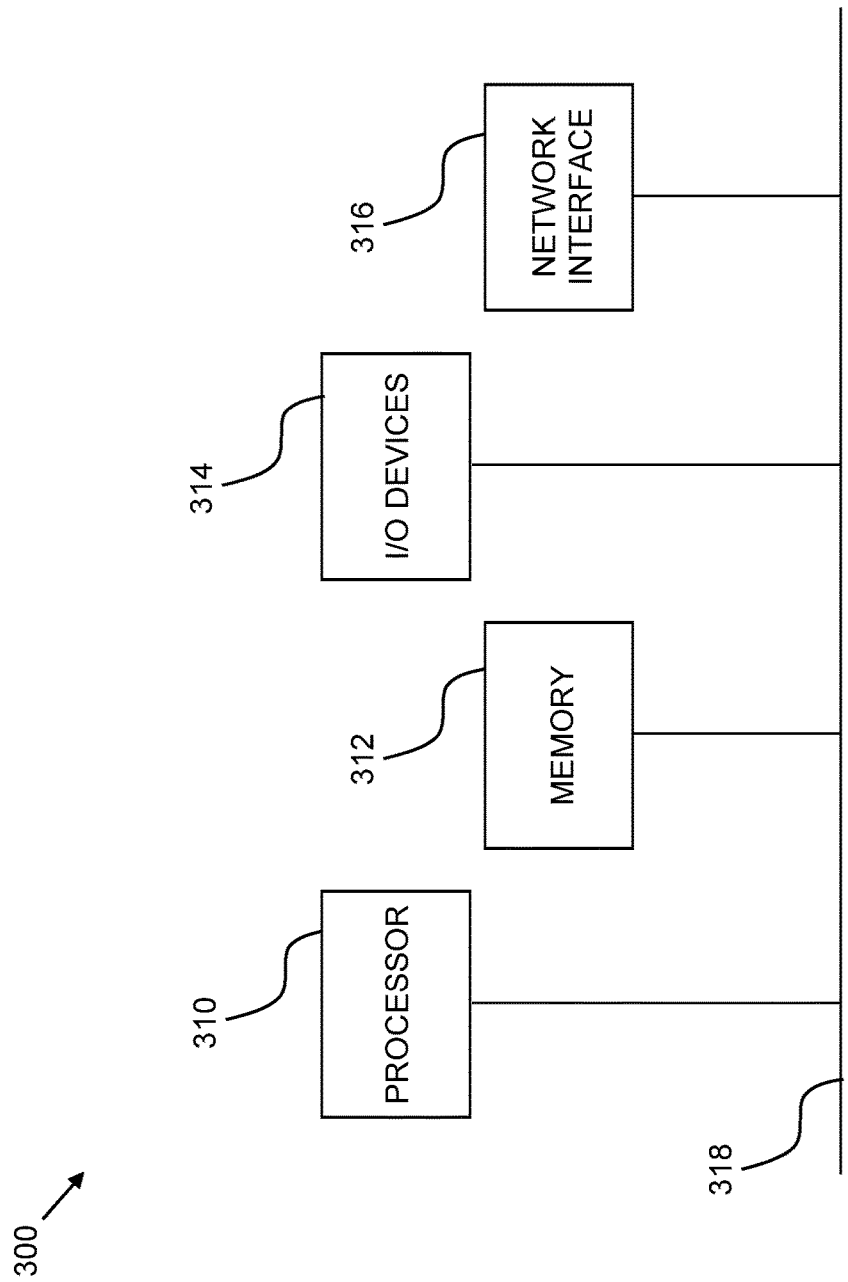

PROTECTING COMPUTER SECURITY APPLICATIONS

BACKGROUND

Computer security applications are often the target of attacks by malicious software when the latter run on an infected computer. Such malicious software may try to uninstall computer security applications, bypass their protection mechanisms, or render them useless by removing, or otherwise blocking access to, system resources that they require. In order to defend against such attacks, computer security applications will often install kernel-resident modules that guarantee their integrity as well as ensure the availability of the system resources that they require. However, this approach is not without its own vulnerabilities and drawbacks, and often requires frequent updates in order to maintain compatibility with changing operating system implementations.

SUMMARY

In one aspect of the invention a computer security method is provided including executing a computer security application on a computer in a first namespace associated with an operating system of the computer, and creating a second namespace associated with the operating system of the computer, where the second namespace is accessible to the computer security application, and where the first namespace is inaccessible from the second namespace.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION

Figure 1:
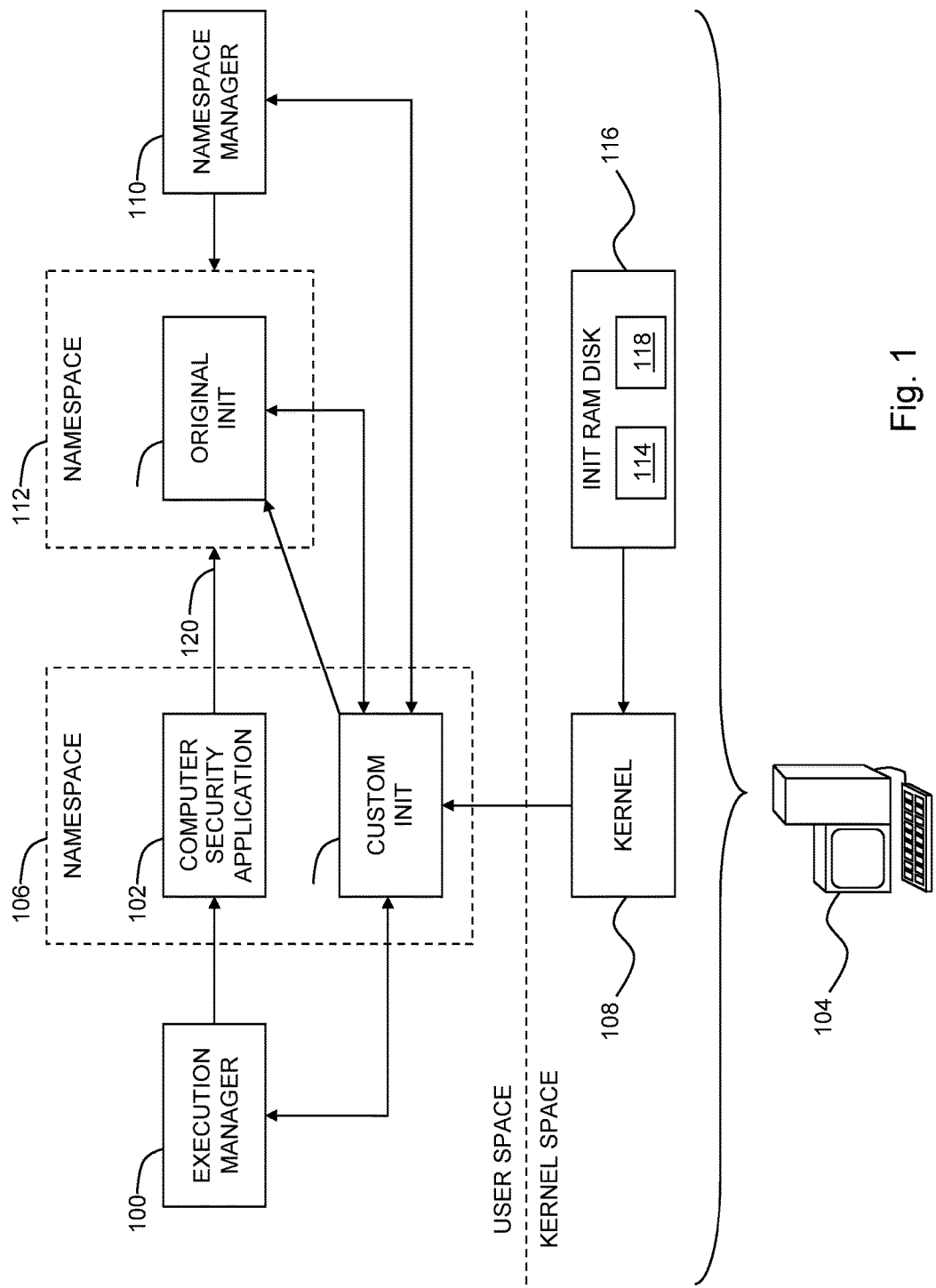
FIG. 1 is a simplified conceptual illustration of a system for protecting computer security applications, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a system for protecting computer security applications, constructed and operative in accordance with an embodiment of the invention. In the system of FIG. 1, an execution manager 100 is configured to execute a computer security application 102 on a computer 104, where computer security application 102 is, for example, anti-virus software or anti-malware software. Execution manager 100 causes computer security application 102 to be executed in a namespace 106 that is associated with an operating system of computer 104, such as the LINUX operating system or a variant thereof. Preferably, execution manager 100 causes computer security application 102 to be executed after execution is begun on computer 104 of a kernel 108 of the operating system, and during a boot process of computer 104, where computer security application 102 is executed in a user space associated with the operating system.

A namespace manager 110 is configured to create another namespace 112 associated with the operating system of the computer, where namespace 112 is created after the execution of computer security application 102 has begun, where namespace 112 is accessible to computer security application 102, and where namespace 106 is inaccessible from namespace 112. Namespace 112 is preferably used for executing applications that are typically executed within a user space associated with the operating system.

In one embodiment, execution manager 100 is implemented as a custom 'init' executable file 114 that replaces an 'init' executable file on an initial ram disk 116 that is loaded during a boot process of computer 104. Custom 'init' executable file 114 is executed by kernel 108 in namespace 106 as custom 'init' executable file 114' and is configured to execute computer security application 102 in namespace 106 as well. Namespace manager 110 is also implemented in custom 'init' executable file 114 and creates namespace 112 after the execution of computer security application 102 has begun. The original 'init' file is stored as a separate 'init' executable file 118 on initial ram disk 116 and is executed by execution manager 100 in namespace 112 as original 'init' file 118' to continue the boot process of computer 104. In this embodiment, custom 'init' executable file 114 is given the name of the original 'init' file, and the original 'init' file is stored under a different filename and location. Alternatively, the name of the original 'init' file is unchanged, custom 'init' executable file 114 is stored under a different filename and location and added to initial ram disk 116, and the operating system's bootloader is configured to provide the filename and location to the kernel and instruct the kernel to load custom 'init' executable file 114 using this information.

A one-way arrow 120 is shown to represent that namespace 112, which includes applications that are executed within namespace 112, is accessible to computer security application 102, whereas namespace 106, which includes applications that are executed within namespace 106, is inaccessible from namespace 112. Thus, applications, including malicious applications, that are executed within namespace 112 after the boot process of computer 104 is completed cannot access computer security application 102, as it is executed within namespace 106, and therefore computer security application 102 is protected from applications that are executed within namespace 112.

Any of the elements shown in FIG. 1 are preferably implemented by computer 104 in computer hardware and/or in computer software embodied in a non-transitory, computer-readable medium in accordance with conventional techniques.

Figure 2:
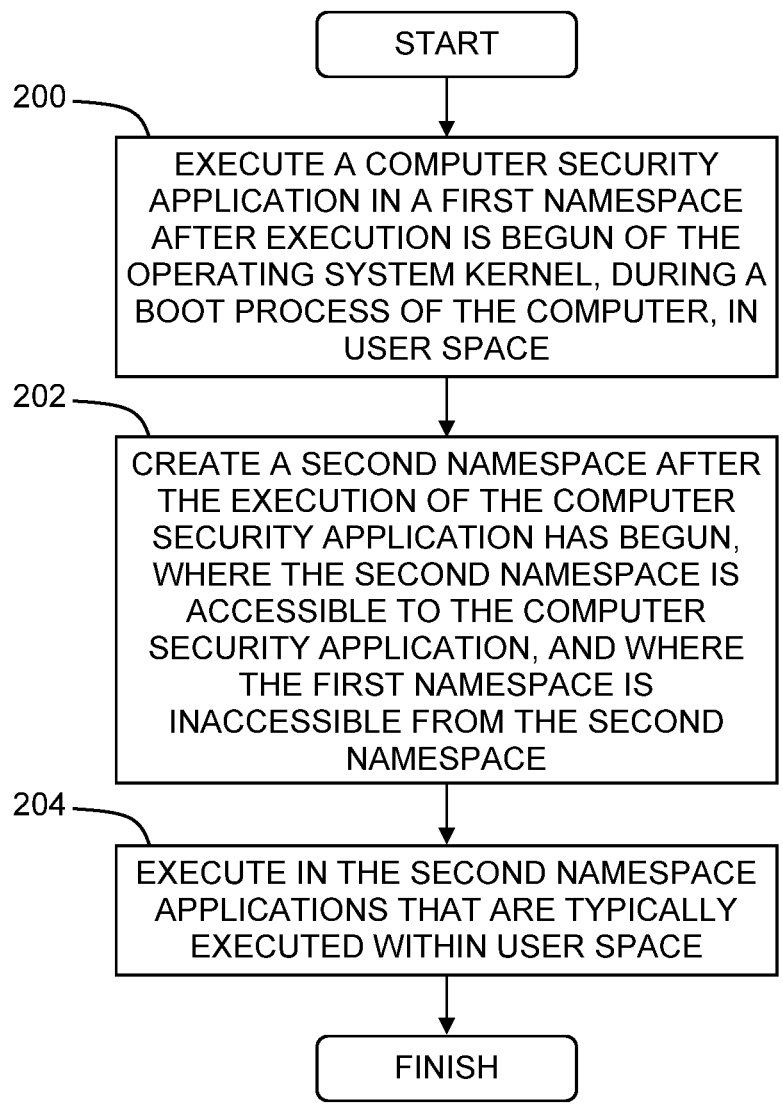
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2 a computer security application is executed in a first namespace that is associated with an operating system of a computer, where the computer security application is executed after execution is begun on the computer of a kernel of the operating system, during a boot process of the computer, and in a user space associated with the operating system (step 200). A second namespace is created that is associated with the operating system of the computer, where the second namespace is created after the execution of the computer security application has begun, where the second namespace is accessible to the computer security application, and where the first namespace is inaccessible from the second namespace (step 202). Applications that are typically executed within a user space associated with the operating system are executed in the second namespace (step 204).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer security method comprising:
   executing a computer security application on a computer in a first namespace associated with an operating system of the computer,
      wherein the first namespace is in a user space associated with the operating system,
      wherein the executing comprises executing the computer security application during a boot process of the computer, and
      wherein the executing comprises executing the computer security application after execution is begun on the computer of a kernel of the operating system;
   creating a second namespace associated with the operating system of the computer,
      wherein the second namespace is in the user space associated with the operating system,
      wherein the second namespace is created after execution is begun of the computer security application in the first namespace,
      wherein the second namespace is created from within the first namespace,
      wherein the second namespace is accessible to the computer security application from within the first namespace, and
      wherein the first namespace is inaccessible from the second namespace; and
      continuing the boot process in the second namespace after execution is begun of the computer security application in the first namespace and prior to the execution of any other application in the second namespace.

2. The method of claim 1 wherein the executing and creating are performed wherein the operating system is a LINUX-type operating system.

3. The method of claim 1 wherein the executing and creating are implemented in any of
   a) computer hardware, and
   b) computer software embodied in a non-transitory, computer-readable medium.

4. A computer security system comprising:
   an execution manager configured to execute a computer security application on a computer in a first namespace associated with an operating system of the computer,
      wherein the first namespace is in a user space associated with the operating system,
      wherein the computer security application is executed during a boot process of the computer, and
      wherein the computer security application is executed after execution is begun on the computer of a kernel of the operating system;
   a namespace manager configured to create a second namespace associated with the operating system of the computer,
      wherein the second namespace is in the user space associated with the operating system,
      wherein the second namespace is created after execution is begun of the computer security application in the first namespace,
      wherein the second namespace is created from within the first namespace,
      wherein the second namespace is accessible to the computer security application from the first namespace,
      wherein the first namespace is inaccessible from the second namespace,
      wherein the boot process is continued in the second namespace after execution is begun of the computer security application in the first namespace and prior to the execution of any other application in the second namespace, and
      wherein the execution manager and the namespace manager are implemented in any of
         a) computer hardware, and
         b) computer software embodied in a non-transitory, computer-readable medium.

5. The system of claim 4 wherein the operating system is a LINUX-type operating system.

6. A computer program product for providing computer security, the computer program product comprising:
   a non-transitory, computer-readable storage medium; and
   computer-readable program code embodied in the storage medium, wherein the computer-readable program code is configured to
   execute a computer security application on a computer in a first namespace associated with an operating system of the computer,
      wherein the first namespace is in a user space associated with the operating system,
      wherein the executing comprises executing the computer security application during a boot process of the computer, and
      wherein the executing comprises executing the computer security application after execution is begun on the computer of a kernel of the operating system, create a second namespace associated with the operating system of the computer,
   wherein the second namespace is in the user space associated with the operating system,
   wherein the second namespace is created after execution is begun of the computer security application in the first namespace,
   wherein the second namespace is created from within the first namespace,
   wherein the second namespace is accessible to the computer security application from the first namespace, and
   wherein the first namespace is inaccessible from the second namespace, and
continue the boot process in the second namespace after execution is begun of the computer security application in the first namespace and prior to the execution of any other application in the second namespace.

7. The computer program product of claim 6 wherein the operating system is a LINUX-type operating system.

\* \* \* \* \*